(12) United States Patent
Iwanczyk et al.

(10) Patent No.: US 6,534,773 B1
(45) Date of Patent: Mar. 18, 2003

(54) RADIATION IMAGING DETECTOR AND METHOD OF FABRICATION

(75) Inventors: Jan S. Iwanczyk, Los Angeles, CA (US); Bradley E. Patt, Sherman Oaks, CA (US)

(73) Assignee: Photon Imaging, Inc., Northridge, CA (US)

( * ) Notice: Subject to any disclaimer, the term of this patent is extended or adjusted under 35 U.S.C. 154(b) by 0 days.

(21) Appl. No.: 09/436,622

(22) Filed: Nov. 9, 1999

Related U.S. Application Data

(60) Provisional application No. 60/107,876, filed on Nov. 9, 1998.

(51) Int. Cl.[7] .................................................. G01T 1/20
(52) U.S. Cl. ................................................. 250/370.11
(58) Field of Search ....................... 250/370.11, 367; 438/65, 71, 73; 257/458

(56) References Cited

U.S. PATENT DOCUMENTS

| | | | | |
|---|---|---|---|---|
| 4,586,988 A | * | 5/1986 | Nath et al. ................ 136/256 |
| 4,870,279 A | * | 9/1989 | Cueman et al. ............. 250/368 |
| 5,153,438 A | * | 10/1992 | Kingsley et al. ........ 250/370.09 |
| 5,550,378 A | * | 8/1996 | Skillicorn et al. .......... 250/367 |
| 5,587,611 A | * | 12/1996 | Botka et al. ................ 257/458 |
| 5,773,829 A | | 6/1998 | Iwanczyk et al. ........... 250/367 |
| 6,025,585 A | * | 2/2000 | Holland .................... 250/208.1 |

* cited by examiner

*Primary Examiner*—Constantine Hannaher
*Assistant Examiner*—Shun Lee
(74) *Attorney, Agent, or Firm*—Christie, Parker & Hale, LLP

(57) ABSTRACT

A radiation imaging detector has a scintillator array to be optically and mechanically coupled to a photodiode array, such that scintillator segments of the scintillator array are positioned over and aligned with respective pixels of the photodiode array. A metallic grid is deposited on the photodiode array to provide sufficient optical contrast for accurate visual alignment of the scintillator and photodiode arrays during fabrication. The metallic grid additionally serves to lower the series resistance of the photodiode entrance electrode. After alignment of the arrays, the upper surface of the scintillator array is closed by a reflective structure.

22 Claims, 4 Drawing Sheets

RADIATION IMAGING DETECTOR AND METHOD OF FABRICATION

This application claims the benefit of U.S. Provisional Application Ser. No. 60/107,876, filed Nov. 9, 1998.

BACKGROUND OF THE INVENTION

The present invention relates to radiation detectors and, more specifically, to a method and structure permitting the accurate alignment of an array of scintillator elements with individual domains of a pixelated photodiode array.

Radiation imaging detectors based on the combination of photodiode arrays and scintillator arrays are known. U.S. Pat. No. 5,773,829 to Iwanczyk and Patt, which is incorporated by reference in its entirety into the present disclosure, discloses such a radiation imaging detector. The components of such imaging detectors must be constructed and positioned to control the propagation of light from the scintillator array to the photodiode array. In one known form, the scintillator consists of numerous segments with optical reflectors between the scintillator segments. The optical reflectors reflect light back into the individual segments. Each segment of the scintillator array must be aligned with a respective photodiode pixel to detect light produced by the interaction of radiation with that scintillator segment.

Thus, there is a need to establish and maintain close alignment between the scintillator segments and the photodiode pixels so that light propagated from each individual segment of the scintillator array is detected by the photodiode associated with that segment and no others.

SUMMARY OF THE INVENTION

The present invention assures good reliability and precision in the assembly of critical components, namely scintillator arrays with photodetector arrays. By accurately aligning the scintillator array with the photodiode array and matching their physical cross-sections, the present invention provides a method for construction of imaging detectors which improves the signal-to-noise ratio for each radiation event, improves the spatial resolution, and reduces the crosstalk compared with conventional imaging detectors. These factors result in better quality of the displayed image.

In one embodiment, the invention involves the deposition and electrical coupling of a metallic grid pattern at the entrance window of the photodiode, thereby reducing the resistance of the transparent upper contact of the photodiode and providing a visually perceptible pattern by which a fabricator can accurately align the scintillator array with pixels of the photodiode. In addition, the scintillator array may be provided with open, light transmissive faces at opposite sides during fabrication, such that light can pass through the array in a direction parallel to the septa of the array. This permits the fabricator to align the scintillator array with the pixels of a photodiode placed adjacent one of the open surfaces, by visually monitoring the alignment through the second open surface. A suitable light reflective plate is then affixed to the second open surface of the scintillator array to cause light generated within the scintillator to be reflected internally until it reaches and is absorbed by the photodiode.

To realize the advantages outlined above, the structure and method of the present invention relate to a radiation imaging detector having a photodiode array formed from multiple pixels, a scintillator array formed from multiple segments and a grid on the surface of the photodiode array. The grid is disposed for ultimate positioning between the photodiode array and the scintillator array. Each of the segments is aligned with a cell of the grid which, in turn, is aligned with a pixel which is aligned with a contact on the opposite side of the photodiode array. The lines of the grid have a width equal to or somewhat greater than the thickness of the septa forming the walls of the scintillator segments. The individual scintillator segments have walls which are opaque to light, and the grid is geometrically matched to the segments and the pixels. The segments have open ends on opposing faces of the scintillator array and a light reflective plate is provided for affixing to one of the opposing faces after the scintillator array is aligned with the grid. The scintillator array is disposed to allow viewing of the grid through a first side prior to affixing the light reflective plate to the first side.

The radiation imaging detector can be fabricated by depositing a grid on the surface of a photodiode array so that the grid is aligned with multiple pixels forming the photodiode array; and aligning the scintillator array with the grid by viewing the grid through the first open end of the scintillator array so that the photodiode array, the scintillator array and the grid are aligned. The second open end of the scintillator array is coupled to the photodiode array and the first open end of the scintillator array is covered with a light reflective plate. The grid is deposited on the surface of the photodiode array in order to lower the series resistance of an entrance electrode of the photodiode array. The grid can be disposed above or below the entrance electrode of the photodiode array.

BRIEF DESCRIPTION OF THE DRAWINGS

The above and other objects of the invention can be better understood by the following description, taken together with the accompanying drawings, in which like numerals are used for similar elements throughout and in which.

DESCRIPTION OF THE PREFERRED EMBODIMENTS

Figure 1:
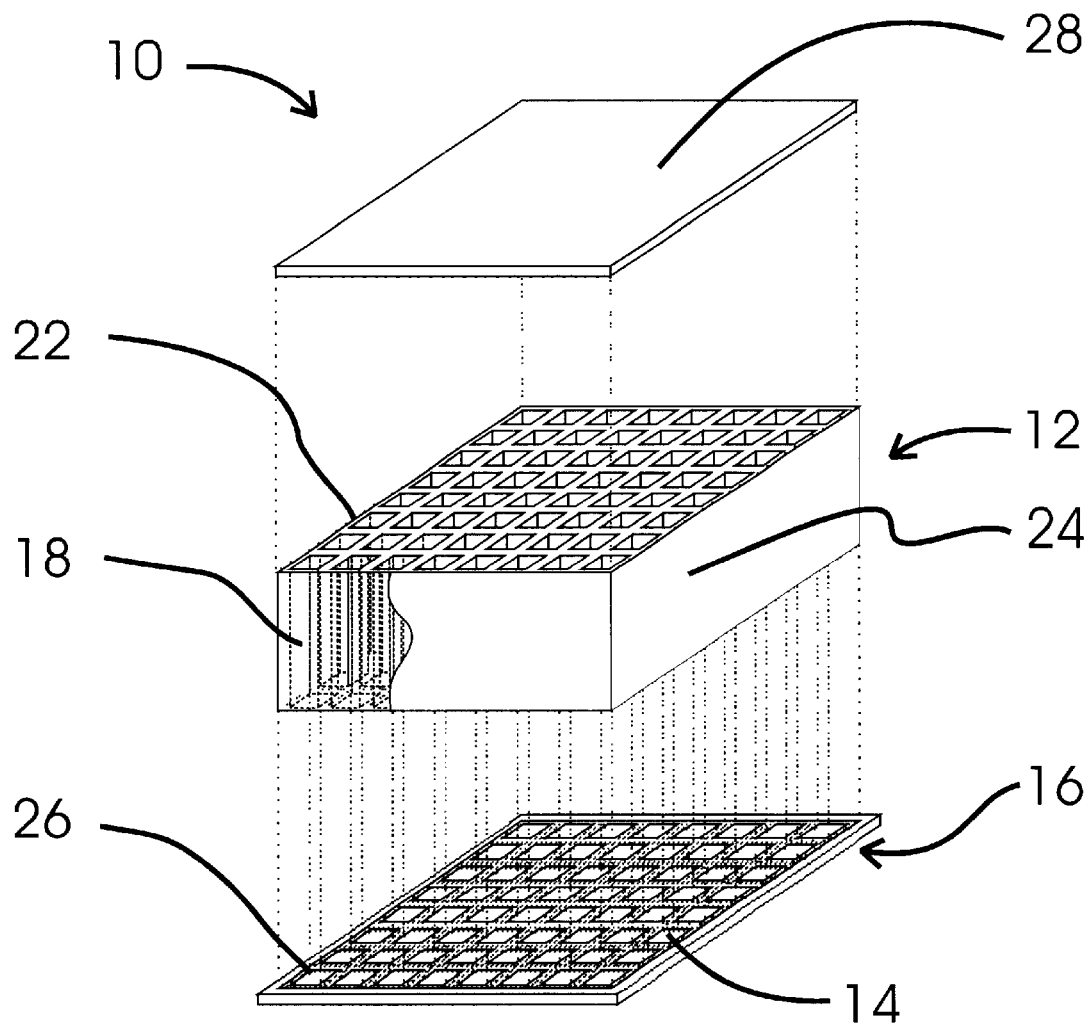
FIG. 1 is an exploded perspective view of a radiation imaging detector constructed according to one embodiment of the invention.
Figure 2:
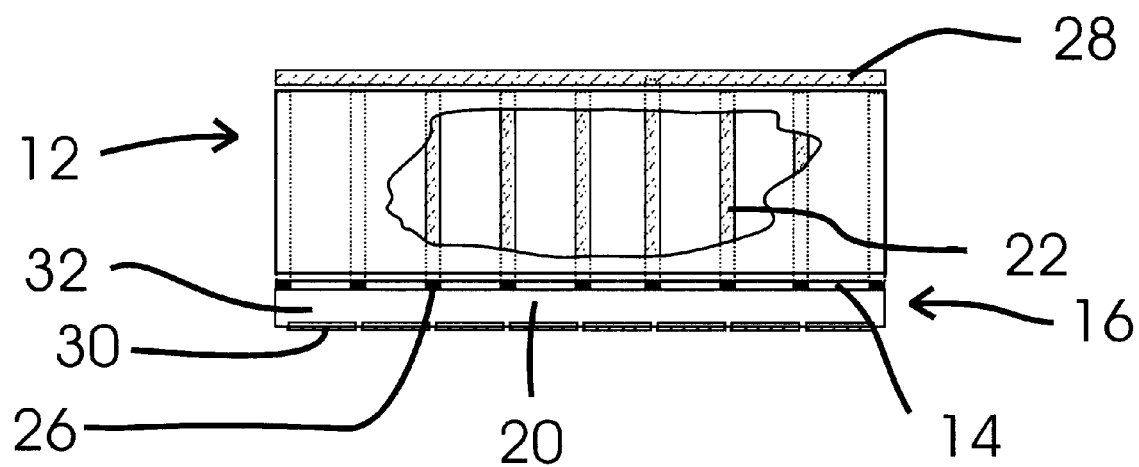
FIG. 2 is a partial sectional view of the radiation imaging detector of FIG. 1.

Referring now to the drawings, in particular FIGS. 1 and 2, a radiation imaging detector 10 has a scintillator array 12 optically and mechanically coupled to a photodiode array 16, such that scintillator segments 18 of the scintillator array 12 are positioned over and aligned with respective pixels 20 of the photodiode array 16. In one form, the pixels 20 are formed in a wafer 32 of silicon or other suitable semiconductor material. The scintillator segments 18 are separated by opaque reflective walls or septa 22 and surrounded at their outer faces by a reflective medium 24.

Figure 3:
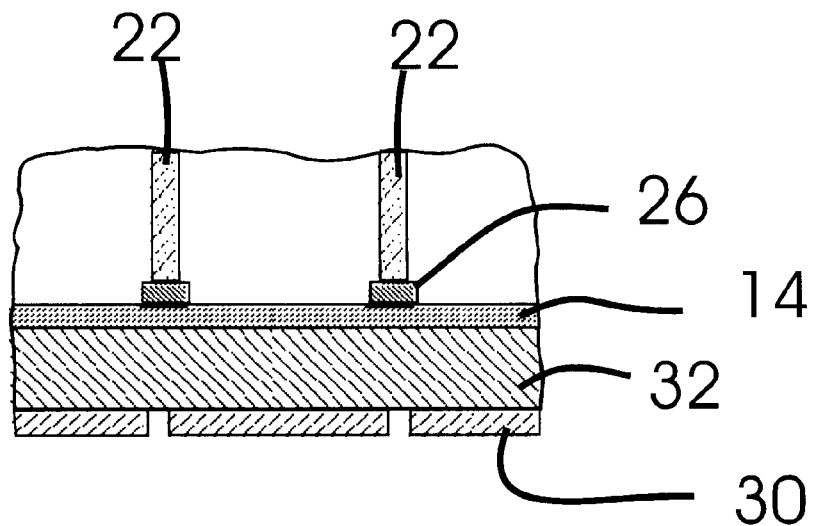
FIG. 3 is a partial cross-sectional view of an embodiment of the radiation imaging detector of FIG. 1 with the metallic grid above the entrance electrode of the photodiode array.
Figure 4:
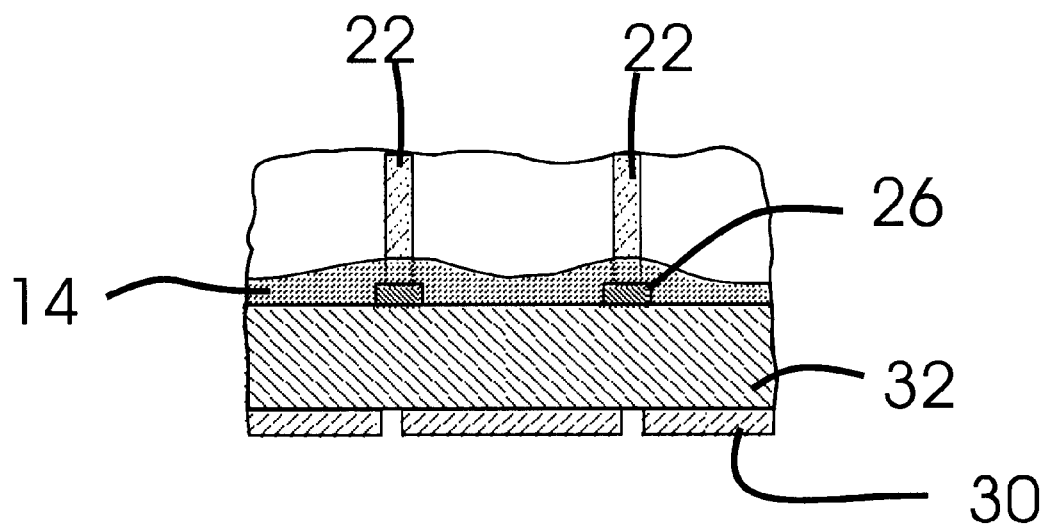
FIG. 4 is a partial cross-sectional view of an embodiment of the radiation imaging detector of FIG. 1 with the metallic grid below the entrance electrode of the photodiode array.

In the illustrated embodiments, a metallic grid 26 is disposed either above (FIG. 3) or below (FIG. 4) the entrance electrode 14 of the photodiode array to provide sufficient optical contrast for accurate alignment of the two arrays during fabrication. The entrance electrode 14 can be created by deposition of an epitaxial layer. When the metallic grid 26 is disposed above the entrance electrode 14, the entrance electrode 14 is disposed between the metallic grid 26 and the wafer 32. When the metallic grid 26 is disposed below the entrance electrode 14, the metallic grid 26 is disposed between the wafer 32 and the entrance electrode 14. The entrance electrode 14 can be created using alternative methods as well. For example, the entrance electrode 14 can be created by implanting or diffusing dopants into the wafer 32 so that the entrance electrode is part of the original wafer 32. The metallic grid 26 is then disposed above the implanted or diffused entrance electrode 14.

Figure 5:
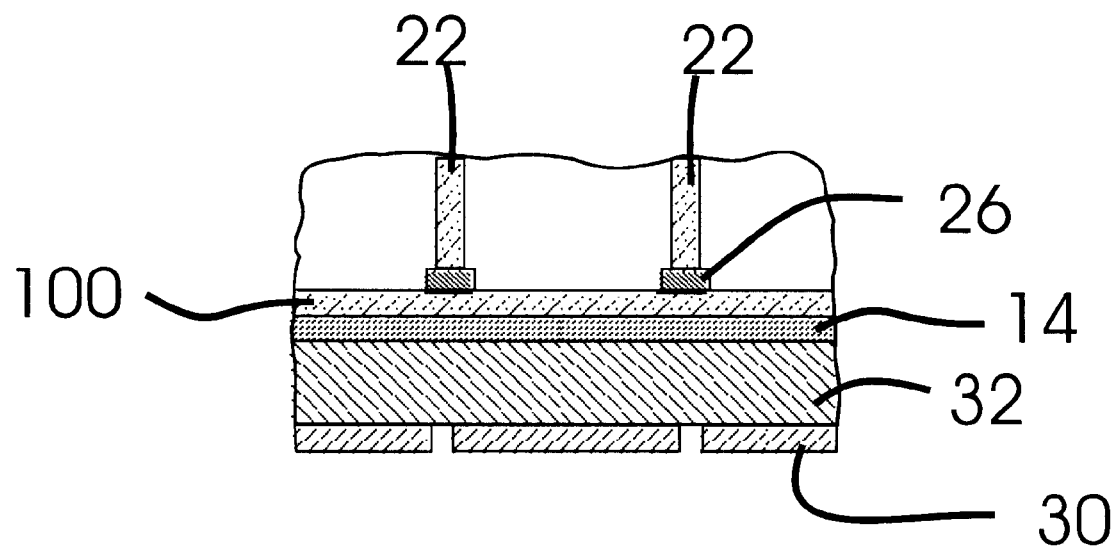
FIG. 5 is a partial cross-sectional view of an embodiment of the radiation imaging detector of FIG. 1 with an antireflective coating below the metallic grid.

As illustrated in FIG. 5, the metallic grid 26 can be placed over an antireflective (AR) coating 100 which is applied over the entrance electrode 14. The AR coating improves the light absorbing efficiency of the entrance window. Placement of the grid 26 over the AR coating improves the contrast between the light reflected from the grid pattern 26 versus the rest of the highly light absorbing coated photodiode entrance window 14. The grid 26 can be laid to directly attached to the AR coating 100. Alternatively, the grid 26 can be directly attached to the wafer with the AR coating 100 forming an outline around the grid 26.

To facilitate alignment even further, the surface (upper) of the scintillator array 12 opposite to the photodiode array 16 may be left unobscured during the process of fabricating the detector 10, enabling accurate alignment to be achieved visually before the scintillator array 12 and the photodiode array 16 are coupled. The upper surface of the scintillator array is then preferably closed by a reflective layer, "plate", or structure 28 so that light produced by scintillation within the segments 18 is kept within the array 12 until it reaches the photodiode array 16.

The metallic grid 26, which in one embodiment is aluminum, thus plays a dual role as an aid to proper alignment of the photodiode array 16 with the scintillator array 12, and as a way to lower the series resistance of the photodiode entrance electrode 14. In order to achieve the first of these functions, the width of the metallized portion of the grid pattern on the photodiode array 16 preferably matches or is slightly wider than the thickness of the septa 22 of the scintillator array 12 to facilitate visualization of the metallized portion, and the openings of the metallic grid 26 must match the cross section of the scintillator crystal segments 18. In addition, the scintillator array 12 must be registered accurately over the photodiode array 16 when the two are interfaced during construction of the imaging detector 10. This is especially important when arrays of large numbers of pixels are used. The grid 26 can be Al or another metal or material with a refractive index different from that of the entrance electrode.

Typical values for the cross sections of the scintillator segments 18 and the corresponding areas of the pixels 20 are between 0.5 mm and 4 mm on a side. Typical values for the scintillator septal walls 22 and corresponding widths of the lines of the photodiode metal grid 26 are between 0.05 mm and 0.5 mm. Small alignment mismatches in x, y, or theta at one edge of the array can lead to gross mismatches throughout the array, causing substantial loss in signal to noise, and increased cross talk between pixels, leading to degradation of the imaging quality of the detector.

The alignment of the metallic grid 26 with the periphery of the pixels 20 can be obtained by utilization of standard technological procedures involving the use of precisely aligned fabrication masks and double-sided processing techniques in construction of the photodiode array 14. The fabrication masks, which are used in the photolithography steps, require precision on the order of ¼ to 1/20 of the minimum line width in the structure. Such precision is available from many fabrication mask vendors. The alignment of the processing masks used on the top and bottom sides of the wafer is accomplished using double-sided alignment equipment such as the KARL ZEISS model number MA6 (with back alignment capability). In this way the metallic grid 26 deposited on the entrance side of the photodiode array 16 is substantially matched with a pixelated pattern of contacts 30 on the back side of the photodiode array. The pitch and width of the metal grid lines are selected to be substantially matched to the pitch and width of the septal walls (reflective medium) 22 of the scintillator array 12.

The entrance electrode ("window") 14 of the photodiode array 16 must be very thin in order to assure high quantum efficiency for the light generated in the scintillator array 12. This requirement imposes a strict limitation on the series resistance of the entrance window 14 and in turn may lead to an increase in electronic noise, particularly for large arrays of photodiodes. Specific photodetector arrays 16 can populate whole or significant fractions of 4"—6" silicon wafers. The metallic grid 26 further lowers the series resistance and electronic noise of the photodiode without penalties related to the decrease in transmission of the scintillating light.

Previously, scintillators have been constructed to have only a single face open for the light transmission. The open face is coupled through an optical compound to the photosensor entrance window in order to allow transmission of the scintillation light to a photosensor. In addition, it is desired to reflect light emanating from the end of the scintillator segment opposite to the photosensor back into the scintillator segment where it can eventually propagate through the scintillator and exit thorough the open end coupled with the photosensor. All other sides of the scintillator are covered with a light reflective media.

One embodiment of the invention involves a special construction of the scintillator array 12, which is used in combination with the geometrically matched metallic grid 26 deposited on the entrance side of the photodiode array 16. In the invention, the scintillator segments 18 of the array 12 are initially constructed with open ends on opposing faces allowing for the transmission of light in a direction parallel to the septa walls from either of the two opposing ends of the array. The scintillation crystal segments themselves are transparent to the visible light, while the scintillator septal walls 22 are opaque and physically separate the scintillator segments 18. The metallic grid 26 at the surface of the photodiode is thus easily visible through the transparent scintillator segments 18 due to the light reflections and the strong contrast between light reflected from the grid pattern 26 versus the rest of the highly light absorbing photodiode entrance window 14.

The described effect achieves a precise and reliable alignment of the photodiode array 16 with the scintillator array 12. Following completion of the alignment procedure, and optical and mechanical coupling between the photodiode array 16 and the scintillator array 12, the remaining (upper) open face of the scintillator is covered with the light reflective plate 28 to complete the device.

The invention described herein is useful with imaging detectors of a variety of different shapes, including square, round, and rectangular geometries. The invention can also be used for a variety of scintillators, including CsI(Tl), GSO, BGO, CsI(Na), LSO, and others, and with a variety of photosensors. The preferred embodiment relates specifically to a silicon photodiode, although other photodiodes or light sensors can be used.

What is claimed is:

1. A radiation imaging detector, comprising:

a photodiode array formed from multiple pixels;

a scintillator array formed from multiple segments, said segments having septa walls;

an electrically conductive grid formed on said photodiode array, said grid having grid lines and being electrically coupled to an entrance electrode of the photodiode array so as to lower the series resistance of the entrance electrode;

said grid disposed for-positioning between said photodiode array and said scintillator array, wherein pitch and width of the grid lines are selected to be substantially matched to the pitch and width of the septa walls so that said grid does not substantially obstruct light collection of the photodiode array.

2. A radiation imaging detector, comprising:

a photodiode structure having a plurality of pixels arranged in a first array;

a scintillator structure positionable over the photodiode structure and having a plurality of segments arranged in a second array matching the first array, said segments having septa walls; and an electrically conductive grid formed on said photodiode structure, said grid having grid lines and being electrically coupled to an entrance electrode of the photodiode structure so as to lower the series resistance of the entrance electrode;

said grid disposed for visual alignment of the first array relative to the second array with the grid located between the photodiode structure and the scintillator structure, wherein pitch and width of the grid lines are selected to be substantially matched to the pitch and width of the septa walls so that said grid does not substantially obstruct light collection of the photodiode structure.

3. The radiation imaging detector of claim 2, wherein:

said segments have open ends on opposing faces of the scintillator structure.

4. The radiation imaging detector, of claim 3, further comprising:

a light reflective structure disposable over one of said opposing faces after the other of said opposing faces is aligned with said grid.

5. The radiation imaging detector of claim 3, wherein:

the second array is disposed to allow viewing of said grid through the open ends of the scintillator structure.

6. The radiation imaging detector of claim 2, wherein:

said grid is geometrically matched to said segments and said pixels.

7. The radiation imaging detector of claim 2, wherein:

said septa walls are opaque to light.

8. The radiation imaging detector of claim 7, wherein:

said grid is geometrically matched to said segments.

9. The radiation imaging detector of claim 8, wherein:

the grid is comprised of multiple cells, each of said cells is aligned with one of said segments and one of said pixels, and each of said pixels is aligned with a contact on an opposite side of said first array.

10. The radiation imaging detector of claim 2, wherein:

the photodiode structure is comprised of a wafer, and the entrance electrode is disposed between the grid and the wafer.

11. The radiation imaging detector of claim 2, wherein:

the photodiode structure is comprised of a wafer, and the grid is disposed between the wafer and the entrance electrode.

12. The radiation imaging detector of claim 2, wherein:

the entrance electrode is created by implanting or diffusing dopants into a wafer on which the photodiode structure is formed, and the grid is disposed on a surface of the wafer.

13. The radiation imaging detector of claim 2, wherein:

an antireflective coating is applied on a surface of the photodiode array.

14. A method for fabricating a radiation imaging detector comprising the steps of:

depositing an electrically conductive grid on a photodiode array so that said grid defines a plurality of pixels, forming the photodiode array, said grid being electrically coupled to an entrance electrode of the photodiode array so as to lower the series resistance of the entrance electrode;

visually positioning a scintillator array over the photodiode array; and aligning septa walls of the scintillator array with grid lines of the grid so that the photodiode array and the scintillator array are positioned in alignment, wherein pitch and width of the grid lines are selected to be substantially matched to the pitch and width of the septa walls so that said grid does not substantially obstruct light collection of the photodiode array.

15. The method of claim 14, further comprising the step of:

viewing said grid through a first open end of said scintillator array to align said scintillator array with said grid and said photodiode array.

16. The method of claim 15, further comprising the step of:

coupling a second open end of said scintillator array to said photodiode array.

17. The method of claim 16, further comprising the step of:

covering said first open end of said scintillator array with a light-reflective structure.

18. The method of claim 14, wherein:

said grid is geometrically matched to scintillator segments.

19. The method of claim 14, wherein:

the photodiode array comprises a wafer, and the entrance electrode is disposed between the grid and the wafer.

20. The method of claim 14, wherein:

the photodiode array comprises a wafer, and the grid is disposed between the wafer and the entrance electrode.

21. The method of claim 14, wherein:

the entrance electrode is created by implanting or diffusing dopants into a wafer on which the photodiode array is formed, and the grid is disposed on a surface of the wafer.

22. The method af claim 14, wherein:

an antireflective coating is applied on a surface of the photodiode array.

* * * * *

UNITED STATES PATENT AND TRADEMARK OFFICE
CERTIFICATE OF CORRECTION

PATENT NO. : 6,534,773 B1
DATED : March 18, 2003
INVENTOR(S) : Jan S. Iwanczyk and Bradley E. Patt It is certified that error appears in the above-identified patent and that said Letters Patent is hereby corrected as shown below:

Column 5,
Line 17, replace "for-positioning" with -- for positioning --.

Column 6,
Line 21, after "pixels" delete the comma.

Signed and Sealed this

Twenty-third Day of December, 2003

JAMES E. ROGAN
*Director of the United States Patent and Trademark Office*